United States Patent
Goldner et al.

(10) Patent No.: US 9,659,473 B2
(45) Date of Patent: *May 23, 2017

(54) FIBER OPTIC SECURITY SYSTEMS INCLUDING A LOCAL CONTROL NODE AND A REMOTE CONTROL UNIT, AND METHODS OF USING THE SAME

(71) Applicant: Avalon Sciences Ltd, Somerset (GB)

(72) Inventors: Eric Lee Goldner, Valencia, CA (US); Gerald Robert Baker, West Hills, CA (US); James Kengo Andersen, Westlake Village, CA (US); Agop Hygasov Cherbettchian, Santa Monica, CA (US)

(73) Assignee: Avalon Sciences Ltd (GB)

( * ) Notice: Subject to any disclaimer, the term of this patent is extended or adjusted under 35 U.S.C. 154(b) by 72 days.

This patent is subject to a terminal disclaimer.

(21) Appl. No.: 14/741,977

(22) Filed: Jun. 17, 2015

(65) Prior Publication Data
US 2015/0287300 A1    Oct. 8, 2015

Related U.S. Application Data

(60) Continuation of application No. 13/775,324, filed on Feb. 25, 2013, now Pat. No. 9,088,372, which is a
(Continued)

(51) Int. Cl.
*G02B 6/00* (2006.01)
*H04B 10/85* (2013.01)
(Continued)

(52) U.S. Cl.
CPC ........ *G08B 13/1481* (2013.01); *G01J 1/0425* (2013.01); *G02B 6/0005* (2013.01); *G08B 13/24* (2013.01); *H04B 10/85* (2013.01)

(58) Field of Classification Search
CPC ..... G02B 13/24; G02B 6/0005; G01J 1/0425; H04B 10/85
(Continued)

(56) References Cited

U.S. PATENT DOCUMENTS 4,155,005 A    5/1979    Knowlton et al.
4,255,015 A    3/1981    Adams et al.
(Continued)

FOREIGN PATENT DOCUMENTS

CN    2643296    9/2004
CN    101199413    6/2008
(Continued)

*Primary Examiner* — Akm Enayet Ullah
(74) *Attorney, Agent, or Firm* — Stradley Ronon Stevens & Young LLP

(57) ABSTRACT

A fiber optic security system is provided. The fiber optic security system includes at least one length of fiber optic cable affixed to at least one item to be monitored using the fiber optic security system. The fiber optic security system also includes at least one local control node, the at least one local control node including at least one light source for generating and transmitting light through the at least one length of fiber optic cable, and the at least one local control node monitoring a status of the light. The fiber optic security system also includes a remote control unit for receiving information from the at least one local control node regarding the status of the light.

40 Claims, 12 Drawing Sheets

Related U.S. Application Data division of application No. 12/850,005, filed on Aug. 4, 2010, now Pat. No. 8,401,354.

(60) Provisional application No. 61/338,822, filed on Feb. 23, 2010.

(51) Int. Cl.
  *G01J 1/04* (2006.01)
  *G08B 13/14* (2006.01)
  *G08B 13/24* (2006.01)
  *F21V 8/00* (2006.01)

(58) Field of Classification Search
  USPC .............. 385/113, 115, 116, 130–135, 147
  See application file for complete search history.

(56) References Cited

U.S. PATENT DOCUMENTS

| | | | |
|---|---|---|---|
| 4,292,628 | A | 9/1981 | Sadler |
| 4,447,123 | A * | 5/1984 | Page .................. G02B 6/2804 250/227.15 |
| 4,800,267 | A | 1/1989 | Freal et al. |
| 4,826,322 | A | 5/1989 | Philips |
| 4,879,755 | A | 11/1989 | Stolarczyk et al. |
| 4,893,930 | A | 1/1990 | Garrett et al. |
| 4,994,668 | A | 2/1991 | Lagakos et al. |
| 5,011,262 | A | 4/1991 | Layton |
| 5,051,799 | A | 9/1991 | Paul et al. |
| 5,172,117 | A | 12/1992 | Mills et al. |
| 5,227,857 | A | 7/1993 | Kersey |
| 5,367,376 | A | 11/1994 | Lagakos et al. |
| 5,397,891 | A | 3/1995 | Udd et al. |
| 5,493,390 | A | 2/1996 | Varasi et al. |
| 5,680,489 | A | 10/1997 | Kersey |
| 5,712,932 | A | 1/1998 | Alexander et al. |
| 5,742,718 | A * | 4/1998 | Harman .................. A61B 18/24 385/53 |
| 5,798,834 | A | 8/1998 | Brooker |
| 5,986,749 | A | 11/1999 | Wu et al. |
| 6,104,492 | A | 8/2000 | Giles et al. |
| 6,157,711 | A | 12/2000 | Katz |
| 6,281,976 | B1 | 8/2001 | Taylor et al. |
| 6,328,837 | B1 | 12/2001 | Vohra et al. |
| 6,381,048 | B1 | 4/2002 | Chraplyvy et al. |
| 6,385,732 | B1 * | 5/2002 | Eckel .................. H02J 13/0062 323/239 |
| 6,453,022 | B1 | 9/2002 | Weinman, Jr. |
| 6,654,521 | B2 | 11/2003 | Sheng et al. |
| 6,819,812 | B2 | 11/2004 | Kochergin et al. |
| 6,891,621 | B2 | 5/2005 | Berg et al. |
| 6,900,726 | B2 | 5/2005 | Graves |
| 7,013,729 | B2 | 3/2006 | Knudsen et al. |
| 7,282,697 | B2 | 10/2007 | Thomas et al. |
| 7,676,824 | B2 * | 3/2010 | Accarie .............. H04L 29/12009 725/78 |
| 7,683,312 | B2 | 3/2010 | Goldner et al. |
| 7,789,572 | B2 * | 9/2010 | Gurreri .............. G02B 6/3831 385/58 |
| 7,840,105 | B2 | 11/2010 | Goldner et al. |
| 7,991,998 | B2 * | 8/2011 | Rosner .............. H04L 12/2697 380/258 |
| 7,994,469 | B2 | 8/2011 | Goldner et al. |
| 7,999,946 | B2 | 8/2011 | Andersen et al. |
| 8,186,584 | B1 * | 5/2012 | Rajewski .............. G06Q 20/22 235/381 |
| 2002/0063866 | A1 | 5/2002 | Kersey et al. |
| 2002/0064331 | A1 | 5/2002 | Davis et al. |
| 2002/0064332 | A1 | 5/2002 | Martin |
| 2003/0094281 | A1 | 5/2003 | Tubel |
| 2003/0145654 | A1 | 8/2003 | Knudsen et al. |
| 2004/0046111 | A1 | 3/2004 | Swierkowski |
| 2004/0060697 | A1 | 4/2004 | Tilton |
| 2004/0071382 | A1 * | 4/2004 | Rich .................. G02B 6/4469 385/12 |
| 2004/0246816 | A1 | 12/2004 | Ogle |
| 2005/0076713 | A1 | 4/2005 | Knudsen |
| 2005/0097955 | A1 | 5/2005 | Berg et al. |
| 2005/0111788 | A1 | 5/2005 | Tsuyama |
| 2006/0083458 | A1 * | 4/2006 | Iffergan .............. G02B 6/4469 385/13 |
| 2006/0115228 | A1 * | 6/2006 | Iffergan .............. G02B 6/4471 385/136 |
| 2006/0120675 | A1 | 6/2006 | Goldner et al. |
| 2007/0065149 | A1 | 3/2007 | Stevens et al. |
| 2008/0122617 | A1 * | 5/2008 | Browning .......... G02B 6/4416 340/541 |
| 2008/0137589 | A1 | 6/2008 | Barrett |
| 2009/0101800 | A1 | 4/2009 | Goldner et al. |
| 2009/0140852 | A1 | 6/2009 | Stolarczyk et al. |
| 2009/0210168 | A1 | 8/2009 | Vincelette |
| 2010/0005860 | A1 | 1/2010 | Coudray et al. |
| 2010/0219334 | A1 | 9/2010 | LeGrand |

FOREIGN PATENT DOCUMENTS

| | | |
|---|---|---|
| JP | 2001-221684 | 8/2001 |
| JP | 2006-172339 | 6/2006 |
| JP | 2007-232515 | 9/2007 |
| KR | 10-1997-0002776 | 1/1997 |
| KR | 10-2002-0008457 | 1/2002 |
| WO | 99/05493 | 2/1999 |
| WO | 2011/050227 | 4/2011 |

\* cited by examiner

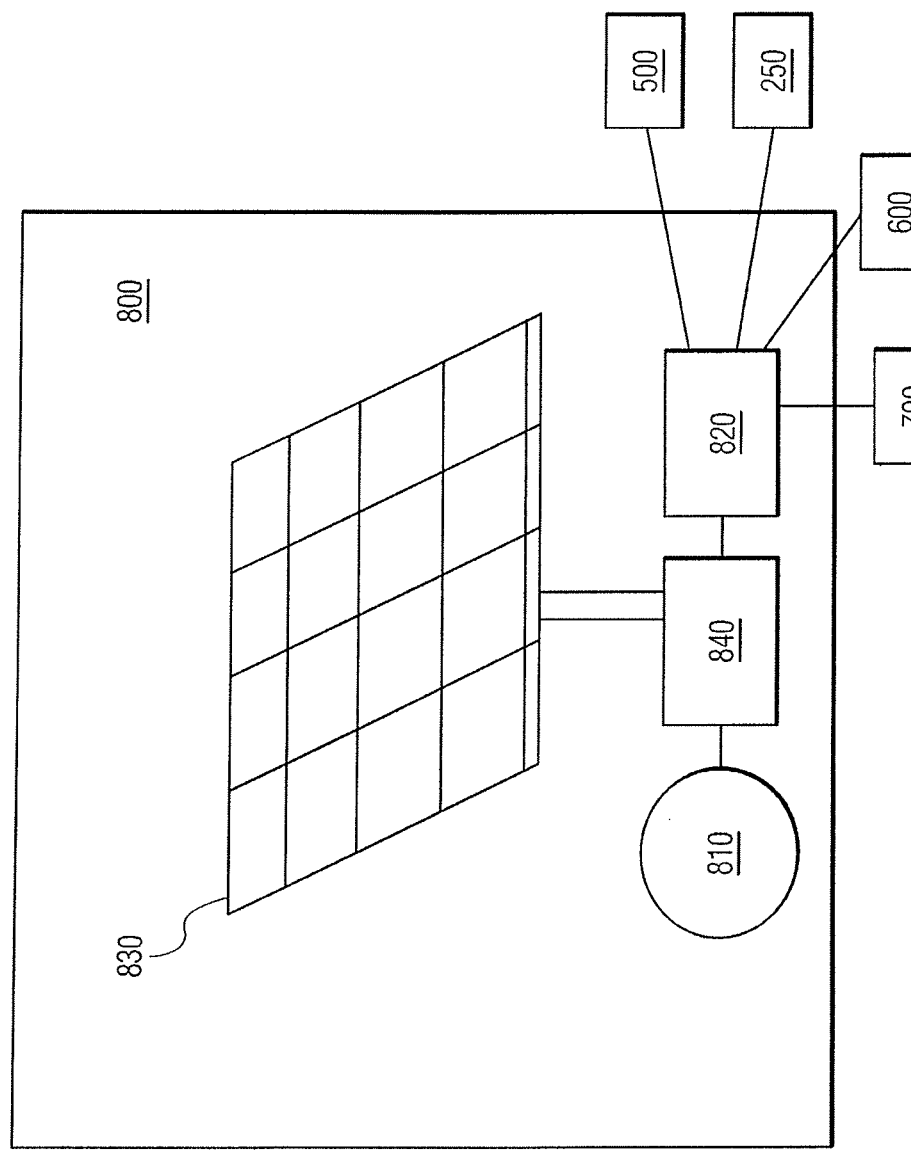

FIBER OPTIC SECURITY SYSTEMS INCLUDING A LOCAL CONTROL NODE AND A REMOTE CONTROL UNIT, AND METHODS OF USING THE SAME

CROSS-REFERENCE TO RELATED APPLICATION

This present application is a continuation of application Ser. No. 13/775,324, filed on Feb. 25, 2013, and now allowed, which application is a divisional of patent application Ser. No. 12/850,005, filed on Aug. 4, 2010, which issued as U.S. Pat. No. 8,401,354 on Mar. 19, 2013, which patent claims the benefit of priority to provisional application Ser. No. 61/338,822, filed on Feb. 23, 2010.

TECHNICAL FIELD

The present invention relates generally to security systems, and more particularly, to fiber optic security systems and methods of using the same.

BACKGROUND OF THE INVENTION

Security systems are widely used in attempts to protect various types of items. Certain items are particularly difficult to protect with conventional security systems. For example, items in remote areas may be difficult to monitor and protect. Further, items that are generally kept outside are particularly susceptible to theft and/or damage.

Solar photovoltaic panels and solar photovoltaic substrates are examples of such items. As is known to those skilled in the art, solar panels are generally installed outside (e.g., on a roof of a building, or on frames mounted directly on the ground, etc.) to receive light from the sun. The solar substrates are typically connected to a frame (i.e., support structure) of the substrate using bolts. Thus, it is relatively easy for a thief to steal valuable solar panels through the removal of a few bolts and electrical cables.

Likewise, cargo that travels in remote areas (e.g., by train, by boat, etc.) is a common target for thieves. Conventional locking mechanisms may be defeated or destroyed rendering the contents of cargo containers accessible by the thief, and some mechanisms may be defeated and later replaced without leaving externally visible evidence of tampering.

Thus, it would be desirable to provide improved security systems for items to be monitored using the security systems.

BRIEF SUMMARY OF THE INVENTION

According to an exemplary embodiment of the present invention, a fiber optic security system is provided. The fiber optic security system includes at least one length of fiber optic cable affixed to at least one item to be monitored using the fiber optic security system. The fiber optic security system also includes at least one local control node, the at least one local control node including at least one light source for generating and transmitting light through the at least one length of fiber optic cable, the at least one local control node monitoring a status of the light. The fiber optic security system also includes a remote control unit for receiving information regarding the status of the light from the at least one local control node.

According to another exemplary embodiment of the present invention, a method of operating a fiber optic security system is provided. The method includes the steps of: (1) affixing at least one length of fiber optic cable to at least one item to be monitored using the fiber optic security system; (2) generating and transmitting light through the at least one length of fiber optic cable using at least one light source of at least one local control node of the fiber optic security system; (3) monitoring a status of the light generated and transmitted in step (2); and (4) transmitting information regarding the status of the light from the at least one local control node to a remote control unit of the fiber optic security system that may provide alarm status information directly to a user or to a higher level monitoring system.

It is to be understood that both the foregoing general description and the following detailed description are exemplary, but are not restrictive, of the invention.

BRIEF DESCRIPTION OF THE DRAWINGS

The invention is best understood from the following detailed description when read in connection with the accompanying drawings. It is emphasized that, according to common practice, the various features of the drawings are not to scale. On the contrary, the dimensions of the various features are arbitrarily expanded or reduced for clarity. Included in the drawings are the following figures:

FIG. 3 is a block diagram of a power supply of a fiber optic security system in accordance with an exemplary embodiment of the present invention;

DETAILED DESCRIPTION OF THE INVENTION

As will be explained in greater detail below, according to certain exemplary embodiments of the present invention, a self-contained security system designed to prevent the theft/removal of valuable equipment is provided. Such an exemplary system includes an enclosure unit (e.g., a sealed enclosure unit) containing an optical transmitter/receiver, a wireless transmitter/receiver, a primary (e.g., external) power source, an automatic (e.g., internal) backup power source, and input/output connections for fiber optical cable (e.g., plastic fiber optic cable). A fiber optic cable is looped through or otherwise securely attached to the item/equipment being monitored (with both ends connected to the sealed enclosure unit) such that it is difficult for the equipment to be removed without the cable being cut or broken, and/or without damage being caused to the sealed enclosure unit (the local control node) or to the item being monitored. In one example, the fiber optic cable is affixed to the item to be monitored in a manner such that the item cannot be separated from the fiber optic cable without at least one of: (1) damaging the item, (2) damaging the local control node, (3) cutting the fiber optic cable, and/or (4) separating the fiber optic cable from the local control node. A light signal is transmitted through the cable and monitored for continuity. A loss of the light signal is indicative of a break in the cable (e.g., attempted theft of the item being monitored). The loss of the light signal results in an alarm which can be discerned locally and/or remotely (e.g., via a wireless connection to a central monitoring station). Unauthorized opening or damaging the enclosure unit will also send an alarm (e.g., to the central monitoring station). The system may also monitor other system characteristics as desired, and provide alarms or other indications related to such other characteristics. Multiple systems (e.g., multiple lengths of fiber optic cable attached to different items to be monitored, multiple enclosure units, etc.) can be operated simultaneously, with all reporting wirelessly to the central monitoring station either directly or via a wireless mesh network.

Figure 1A:
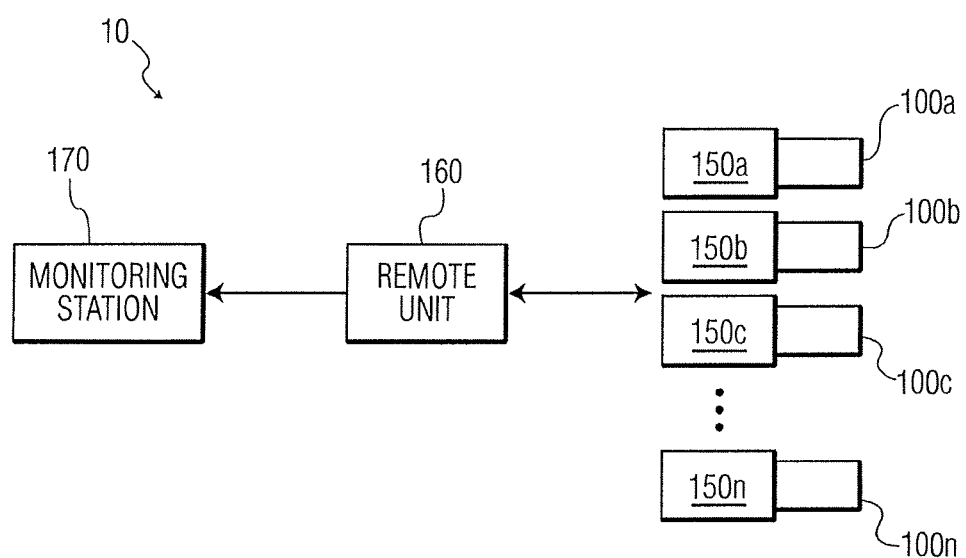
FIGS. 1A-1B are block diagrams illustrating a fiber optic security system in accordance with an exemplary embodiment of the present invention.

Referring now to the drawings, in which like reference numbers refer to like elements throughout the various figures that comprise the drawings, FIG. 1A illustrates fiber optic security system 10. Fiber optic security system 10 includes a plurality of local control nodes 150*a*, 150*b*, 150*c*, . . . , 150*n*. Each local control node is connected to at least one length of fiber optic cable 100*a*, 100*b*, 100*c*, . . . , 100*n*. For example, local control node 150*a* is connected to fiber optic cable 100*a* (which is affixed to an item to be monitored using system 10). Each local control node communicates with remote control unit 160. Remote control unit 160 communicates with monitoring station 170 (e.g., remote control unit 160 communicates status conditions and alarm conditions to monitoring station 170). For example, monitoring station 170 may be a facility monitoring system such as a control room or control station or the like.

Fiber optic cable 100 (e.g., 100*a*, 100*b*, 100*c*, . . . , 100*n*) may be any type of fiber optic cable generally available such as, for example, silica based optical fiber cables (e.g., SMF-28, manufactured by Corning, Inc.), plastic optical fiber cables (e.g., Super Eska fiber cable, produced by the Eska Optical Fiber Division of Mitsubishi Rayon Co., Ltd.), or others.

Figure 1B:
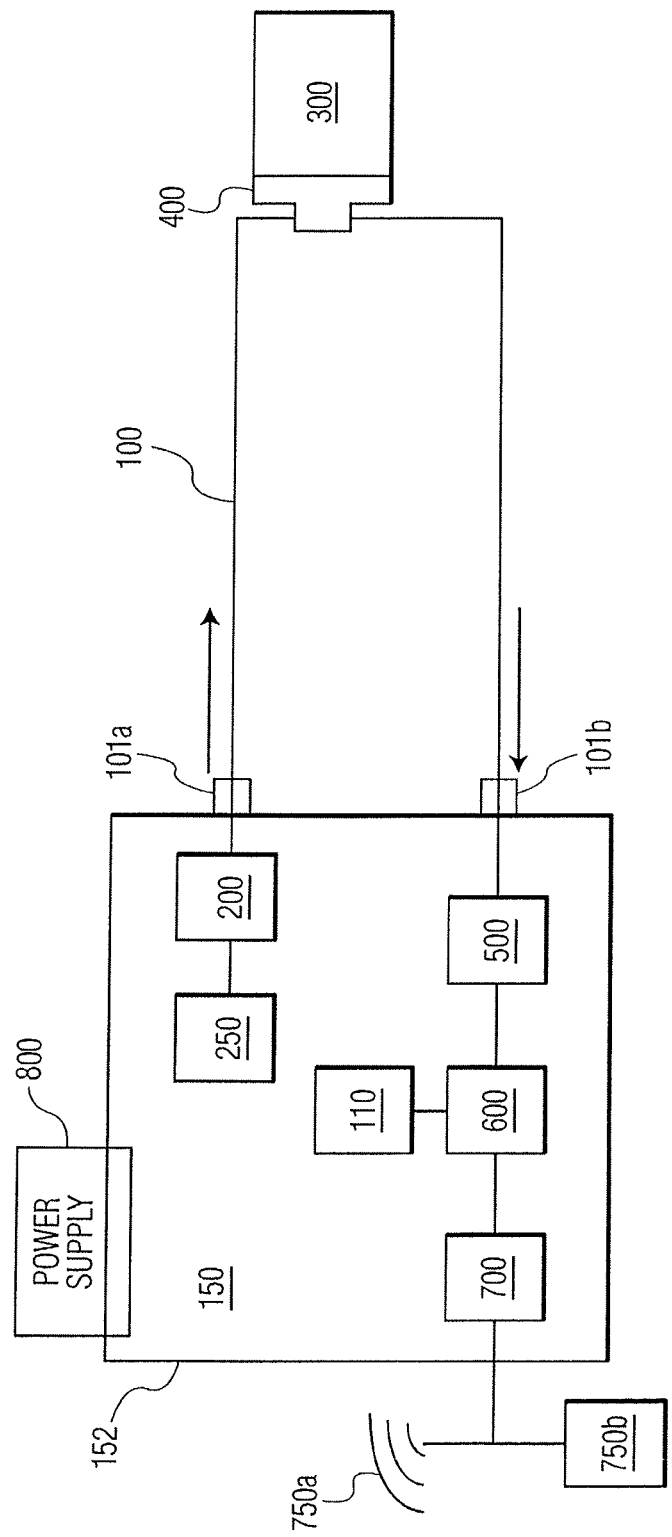

FIG. 1B illustrates an exemplary local control node 150 (such as node 150*a*, 150*b*, etc. of FIG. 1A) connected to fiber optic cable 100. In this embodiment, fiber optic cable 100 is affixed to item 300 (an item to be monitored using system 10) using fastener 400. Local control node 150 includes enclosure 152 which houses light source/optical source 200, optical current control circuit 250, optical receiver 500, processor 600, communication device 700, and at least a portion of power supply 800. Power supply 800 (explained in greater detail below with respect to FIG. 3) provides power to various elements of local control node 150.

One end of fiber optic cable 100 is attached to light source/optical source 200 through connector/adapter 101*a*. Light source 200 may be a laser, or may be a light emitting diode (LED) such as an edge emitting light emitting diode (an EELED), a surface light emitting diode (an SLED), or others. Light source 200 may be operated in a continuous wave (CW) mode, in a pulsed mode, or other transmission modes. In an exemplary pulsed mode, an optical signal with a pulse width on the order of 1 millisecond and a repetition rate on the order of 10 Hz is provided. An exemplary range for the repetition rate is between approximately 0.001 seconds and 10 seconds. As will be appreciated by those skilled in the art, such short optical pulses minimize the electrical power used; however, such a moderate repetition rate ensures that the fiber cannot be cut and re-attached before the system can determine that a security breach has occurred. Another end of fiber optic cable 100 is attached to optical receiver 500 through connector/adapter 101*b*.

Light source 200 is controlled by optical current control circuit 250, and generates an optical signal transmitted along fiber optic cable 100. The optical signal travels along fiber optic cable 100 and returns to optical receiver 500 of local control node 150. The output of optical receiver 500 is connected to processor 600 (e.g., digital signal processor 600, microcontroller 600, etc.). Processor 600 also receives auxiliary information 110 related to fiber optic security system 10. As will be explained in greater detail below, auxiliary information 110 may include information from various additional sources such as, for example, an input (e.g., a digital input) from an interlock of enclosure 152 (e.g., interlock 152*a* shown in FIGS. 5A-5B); an input (e.g., an analog input) monitoring a voltage of a power supply (e.g., monitoring a voltage of batteries 820 in FIG. 3), amongst other inputs. The output of processor 600 is connected to communications device 700. Communications device 700 communicates with remote unit 160 (shown in FIG. 1A), for example, via wireless communication 750*a* or wired communication 750*b*.

Figure 2A:
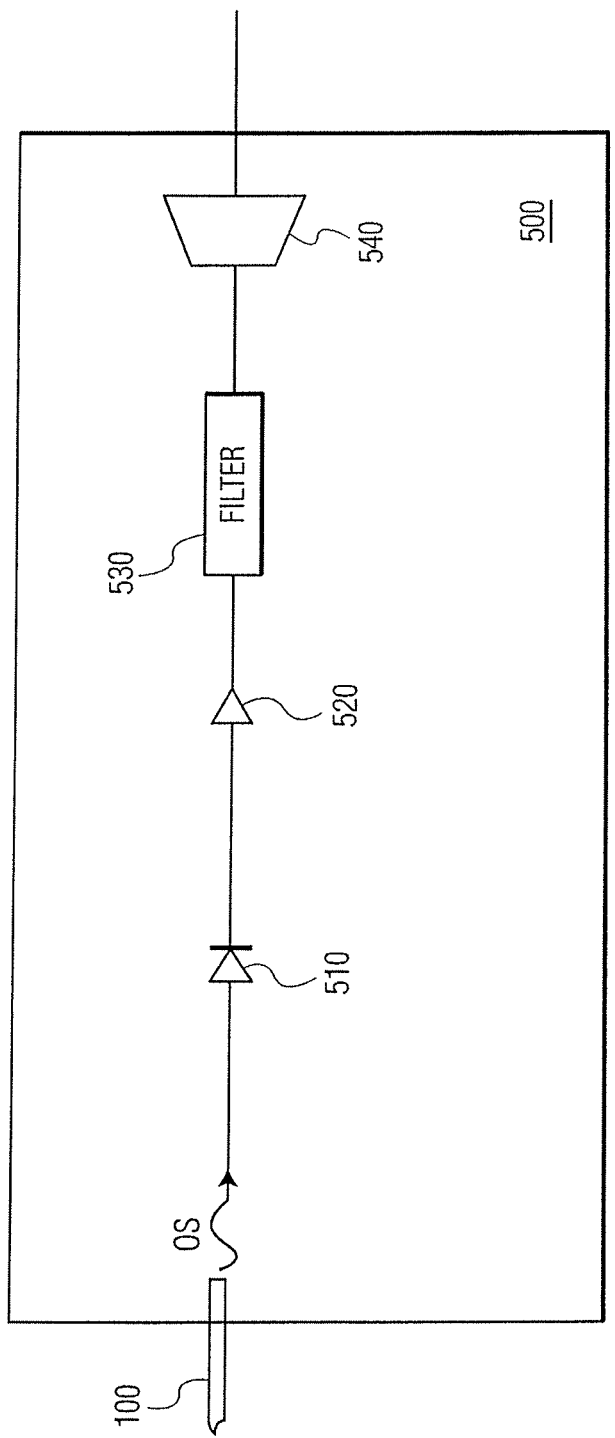
FIG. 2A is a block diagram of an optical receiver of a fiber optic security system in accordance with an exemplary embodiment of the present invention.

FIG. 2A illustrates exemplary optical receiver 500 (i.e., an exemplary light receiving unit). Optical receiver 500 receives optical signal OS (i.e., light OS generated by light source 200), and converts optical signal OS to an electrical signal, and then amplifies, filters, and samples the electrical signal. More specifically, optical signal OS is received by photodetector 510 (e.g., a photodiode, a phototransistor, a photodarlington, etc.). Photodetector 510 converts optical signal OS into an electrical signal which is received by electrical amplifier 520 which provides signal gain to the electrical signal. The amplified electrical signal is received by electrical filter 530 which is configured to reject signals of unwanted frequencies. The output of electrical filter 530 is connected to analog to digital converter 540 (i.e., ADC 540).

The output of optical receiver 500 (after it passes through ADC 540) is connected to processor 600. Processor 600 may be considered to include a detection unit for analyzing the output electrical signal from optical receiver 500. For example, processor 600 may be used to detect at least one of (1) continuity of the fiber optic cable, and (2) connectivity between the fiber optic cable and the local control node. Further, processor 600 may also analyze the output electrical signal from optical receiver 500 to monitor the intensity of light received from each corresponding optical pulse signal. If the intensity of light received during a light pulse is above a preset threshold, a normal condition exists, and no alarm state is communicated. However, if the pulse intensity is below the preset threshold, a tamper or theft condition may be assumed, and processor 600 transmits an appropriate signal to communications device 700 (See FIG. 1B). Likewise, the intensity of the light in the "off" portion of the light pulse may also be monitored. For example, this type of "off" light monitoring may be undertaken to prevent defeating the local control node logic by simply shining a continuous light source in place of optical fiber 100 at connector/adapter 101b in FIG. 1B. In different embodiments, communications device 700 may be an RS-232 or USB transceiver, or an RF wireless transceiver (via an antenna), amongst others.

Figure 2B:
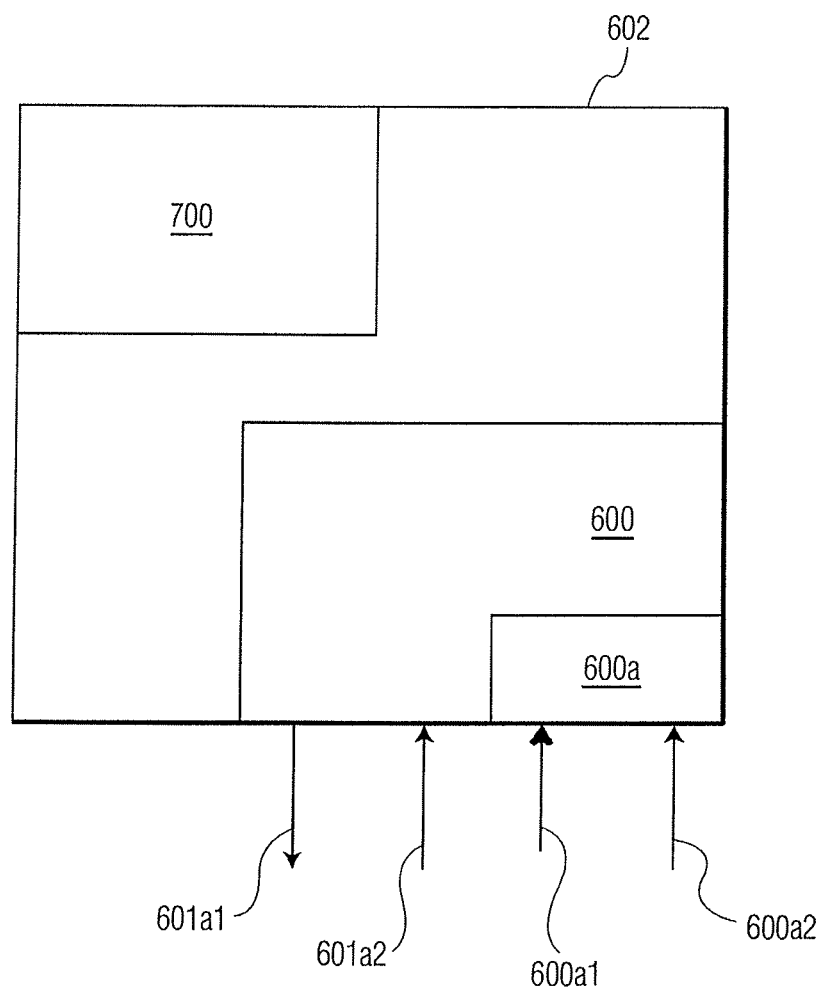
FIG. 2B is a block diagram of a module including a processor and a radio frequency transceiver of a fiber optic security system in accordance with an exemplary embodiment of the present invention.

Certain of the elements of local control node 150 may be included in a single module within enclosure 152 of FIG. 1B. FIG. 2B illustrates one such example, where processor 600 and communications device 700 are provided in a single module 602. In this example, processor 600 includes analog to digital converter (ADC) 600a such that processor 600 can receive both analog and digital inputs. Analog inputs include battery voltage 601a1 (e.g., the voltage of batteries 820 in FIG. 3 described below) and receiver output 601a2 (e.g., the voltage of the signal transmitted from optical receiver 500 to ADC 600a). An exemplary digital input include interlock signal 601a2 (e.g., the status of interlock 152c in FIGS. 5A-5B described below). Also illustrated is an exemplary digital output signal, that is, light source drive signal 601a1 (e.g., the drive signal used in connection with optical current control circuit 250 for operating light source 200).

By analyzing the various signals provided to processor 600, local control node 150 (e.g., through processor 600) may be used to determine a variety of alarm conditions, whereby the alarm condition may be communicated to remote control unit 160 (and may be further communicated to monitoring station 170 by remote control unit 160). Exemplary alarm conditions include, but are not limited to: (1) damage to the fiber optic cable; (2) disconnection between the fiber optic cable and the local control node; (3) damage or tampering with the local control node; (4) unintended restart of a local control node; and (5) a characteristic of the light generated and transmitted through the fiber optic cable differing from a predetermined range of the characteristic. Such a characteristic of the light may be (a) an intensity of the light generated and transmitted through the fiber optic cable, (b) a repetition rate of a pulsing of the light generated and transmitted through the fiber optic cable, and (c) a duration of pulses of the light generated and transmitted through the fiber optic cable. Another exemplary alarm condition that may be communicated from the remote control unit 160 (e.g., to monitoring station 170) is an interruption or loss of electrical power to the local control node.

FIG. 3 illustrates power supply 800. Power supply 800 includes charging circuit 840. Charging circuit 840 receives electrical power from an external source such as, for example, photovoltaic panel 830 and/or AC power supply 810. Charging circuit 840 provides power to batteries 820. The output of batteries 820 is used to provide power to, for example, optical source current control circuit 250, optical receiver 500, processor 600, and communications device 700.

Figure 4A:
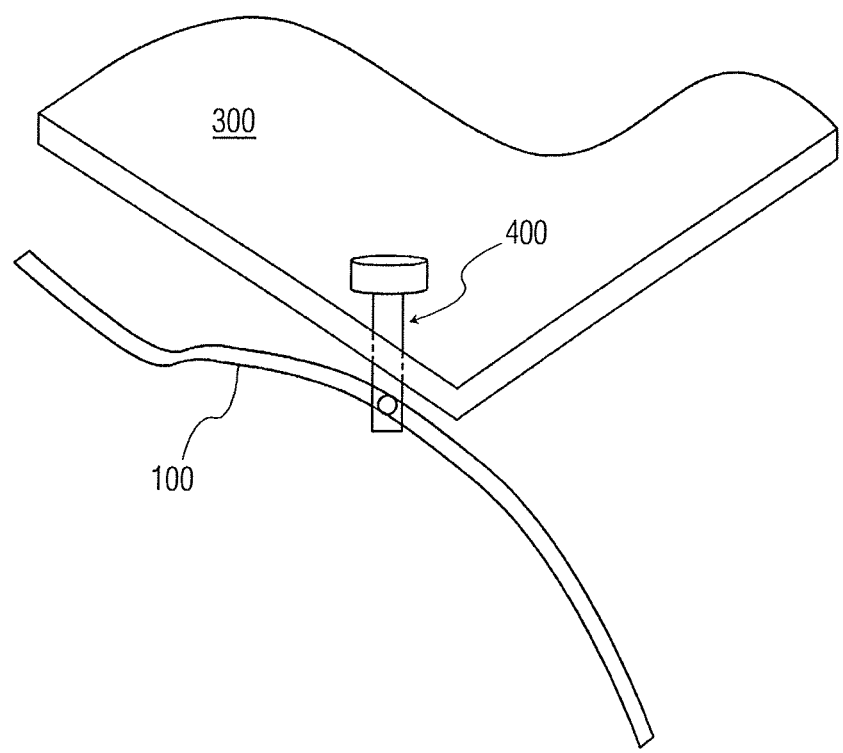
FIGS. 4A-4B are respectively perspective and side views of a fastener used to affix a fiber optic cable to an item to be monitored using a fiber optic security system in accordance with an exemplary embodiment of the present invention.
Figure 4B:
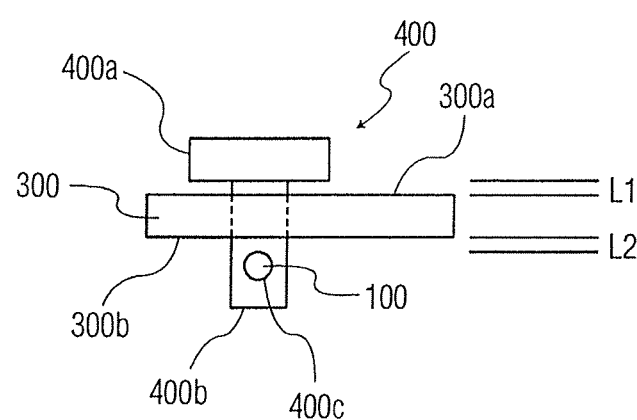

FIGS. 4A-4B illustrate a portion of item 300 (i.e., an article 300, an object 300, etc.) to be monitored using fiber optic security system 10. For example, the portion of item 300 may be a frame or support structure of item 300. In one embodiment using a fastener to affix the fiber optic cable 100 to the item 300, as shown in FIGS. 4A-4B, fastener 400 is engaged in an aperture defined by item 300. Fastener 400 may be manufactured and installed in such a way that fiber optic cable 100 cannot easily be removed from fastener 400 without either disconnecting optical fiber cable 100 from the local control node (e.g., via connector 101a and/or 101b shown in FIG. 1B) or damaging/destroying optical fiber cable 100. Fastener 400 includes head 400a and shaft 400b. Shaft 400b of fastener 400 (e.g., a clevis pin 400 such as a clevis pin made of steel, brass, or another material having a high elastic modulus such that the clevis pin cannot be easily damaged, broken, or removed from article/item 300 without damaging fiber optic cable 100) is inserted into the aperture defined by item 300. Shaft 400b defines aperture 400c. Fiber optic cable 100 has been inserted into hole/aperture 400c. It is generally desired to minimize the exposed length of shaft 400b between (a) head 400a and (b) first side 300a of item 300, labeled as L1. Further, is generally desired to minimize the exposed length of shaft 400b between (a) second side 300b of item 300 and (b) hole 400c, labeled as L2. In one example, it is desired that each of L1 and L2 be less than or equal to 1 mm. In another exemplary embodiment of the present invention, L1 combined with L2 is less than or equal to 1 mm.

Figure 5A:
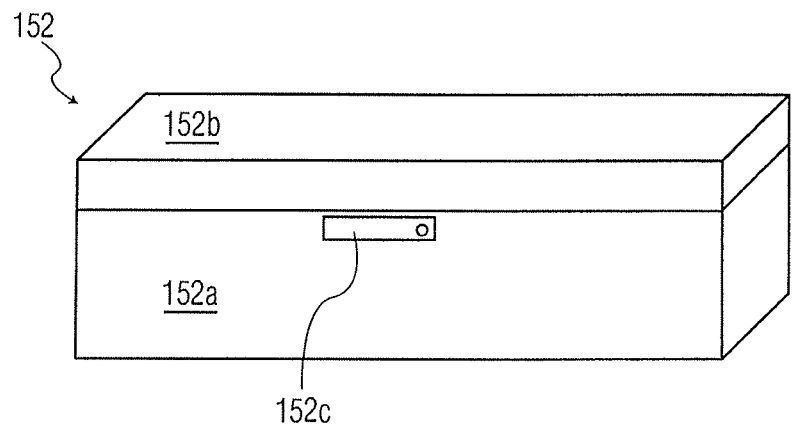
FIGS. 5A-5B are perspective views of an enclosure of a local control node of a fiber optic security system in accordance with an exemplary embodiment of the present invention.
Figure 5B:
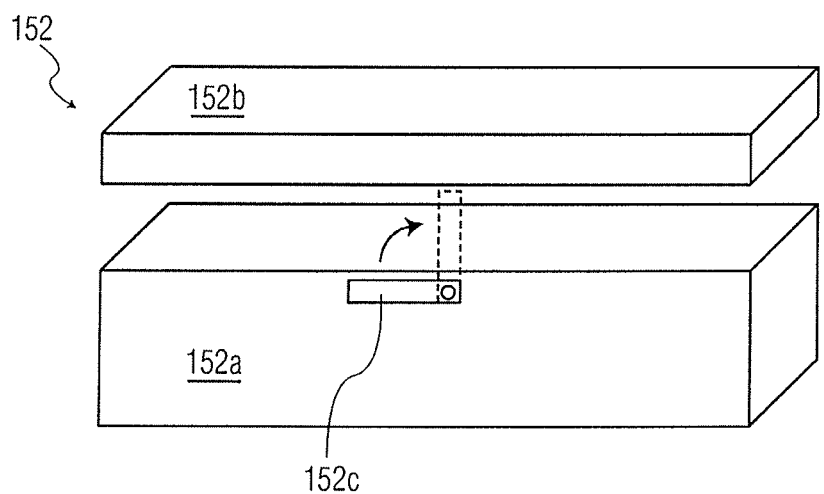

FIGS. 5A-5B illustrate exemplary enclosure 152 of local control node 150. Enclosure 152 includes body portion 152a, lid 152b, and interlock 152c for monitoring tampering with enclosure 152'(e.g., for monitoring the unauthorized opening of enclosure 152). In FIG. 5A, interlock 152c (e.g., a spring loaded switch) is in a closed position, and the closed status of interlock 152c is communicated to processor 600 as part of auxiliary information 110 (shown in FIG. 1B). If lid 152b is removed from body portion 152a during a monitoring period (e.g., an unauthorized opening), interlock 152c will switch to an open position, and the open status of interlock 152c is communicated to processor 600 of local control node 150. Local control node 150 communicates the open status (e.g., as an alarm condition) to remote control unit 160. Remote control unit 160 communicates the open status to monitoring station 170 (if the security system includes such a monitoring station).

The fiber optic security systems according to the present invention may be used to monitor any type of item(s) as desired. Exemplary items that may monitored using the fiber optic security system of the present invention include, for example: (1) solar photovoltaic panel(s) configured to convert light energy received by the solar photovoltaic panel into electrical energy; (2) a cargo container configured to hold and secure goods during transit or storage; (3) a camera; (4) an entry door, amongst others.

Figure 6A:
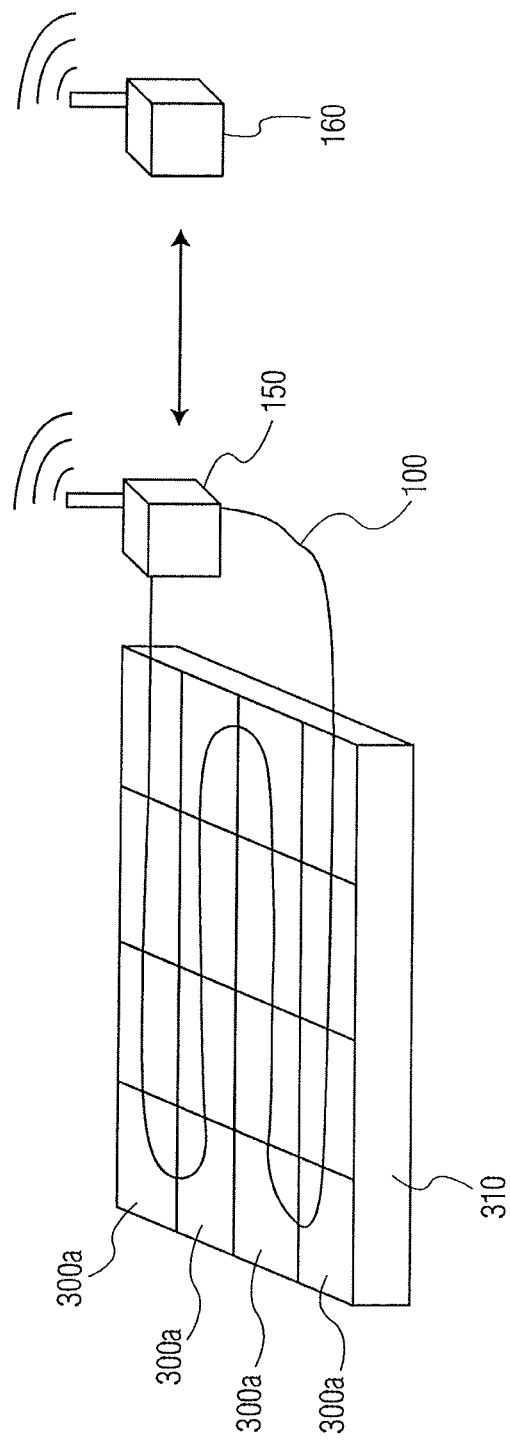
FIG. 6A is a block diagram perspective view of an array of solar photovoltaic panels and elements of a fiber optic security system in accordance with an exemplary embodiment of the present invention.

Solar photovoltaic panels are increasingly subject to theft. The panels are valuable and are generally removable from a mounting structure (e.g., a metal frame) that holds the panels by removing bolts. The panels are often in a remote location making them particularly accessible to thieves. Thus, according to certain exemplary embodiments of the present invention, solar photovoltaic panel security systems are provided. FIG. 6A illustrates an array 310 of solar photovoltaic panels 300a. Fiber optic cable 100 is affixed to each of panels 300a (e.g., using a fastener such as fastener 400 illustrated in FIGS. 4A-4B). That is, the length of fiber optic cable 100 is looped through array 310 such that a portion of cable 100 is affixed to a portion of each of panels 300a (e.g., a mounting structure of each of panels 300a). Both ends of cable 100 are connected to local control node 150 (e.g., a local control node such as node 150 illustrated and described above with respect to FIG. 1B). Local control node 150 communicates with remote control unit 160.

Figure 6B:
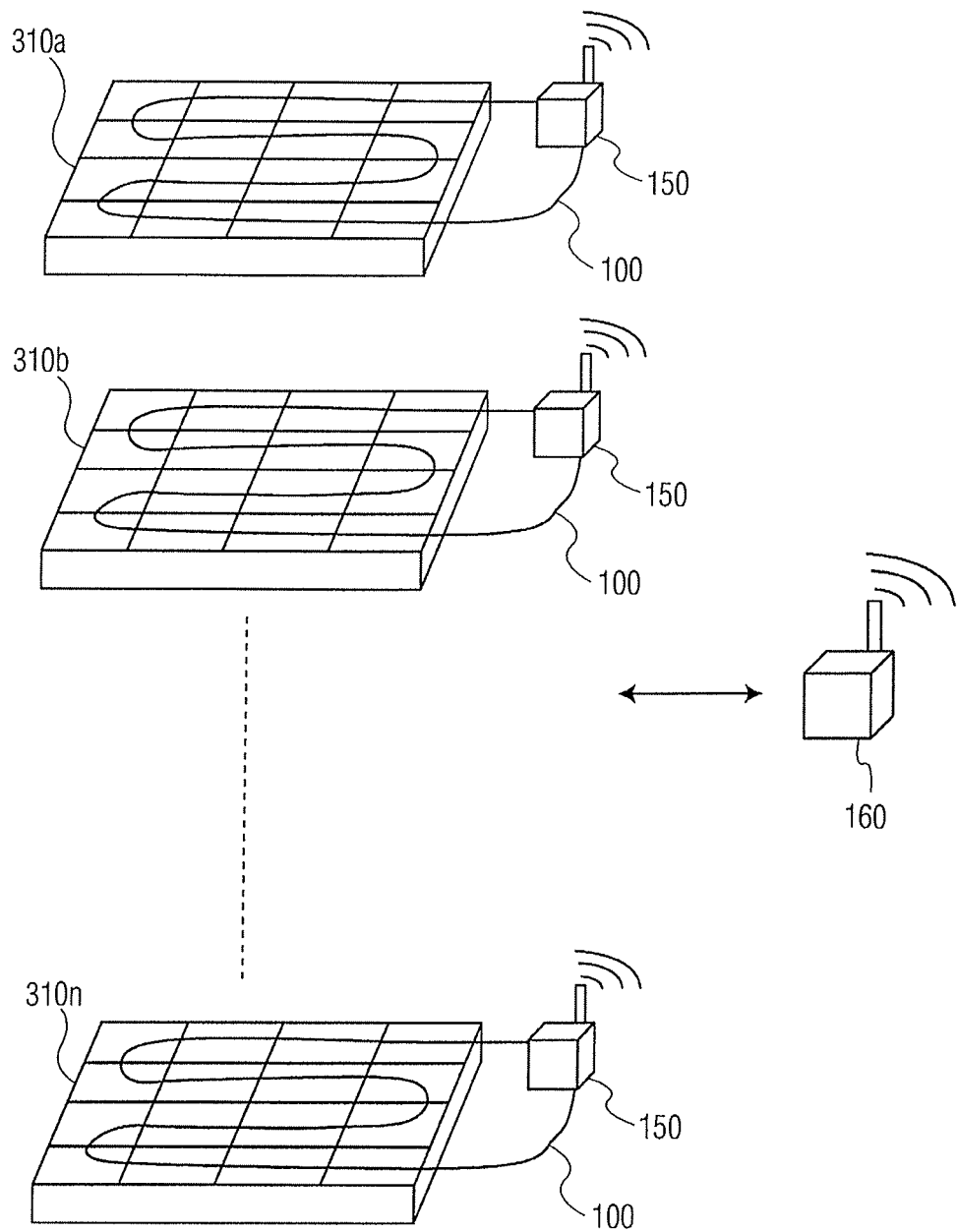
FIG. 6B is a block diagram perspective view of a plurality of solar photovoltaic panel arrays and elements of a fiber optic security system in accordance with an exemplary embodiment of the present invention.

FIG. 6B illustrates a plurality of arrays of solar photovoltaic panels (i.e., arrays 310a, 310b, . . . , 310n). Each array is connected to a corresponding local control node 150 through a respective fiber optic cable 100. Each of the local control nodes 150 communicates with remote control unit 160.

Figure 7A:
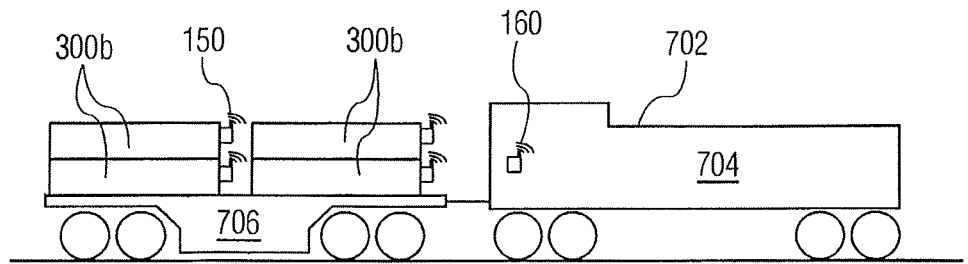
FIG. 7A is a block diagram side view of a cargo train and elements of a fiber optic security system in accordance with an exemplary embodiment of the present invention.
Figure 7B:
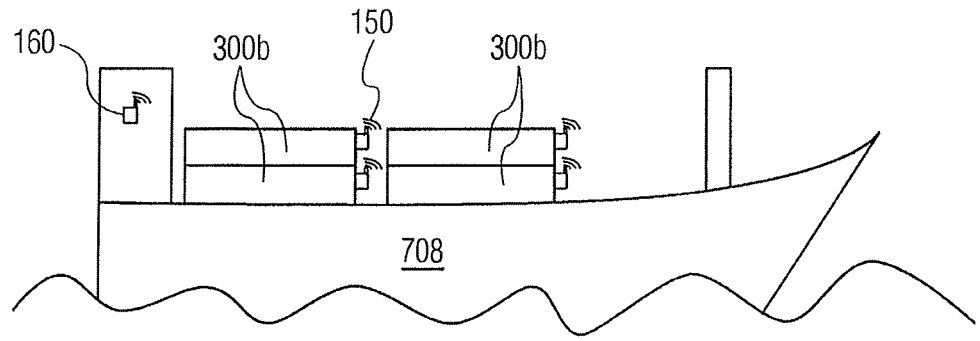
FIG. 7B is a block diagram side view of a cargo boat and elements of a fiber optic security system in accordance with an exemplary embodiment of the present invention.
Figure 7C:
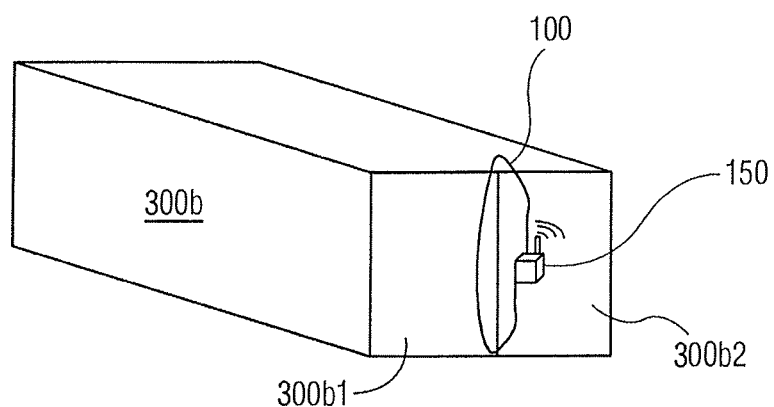
FIG. 7C is a block diagram perspective view of a cargo container and elements of a fiber optic security system in accordance with an exemplary embodiment of the present invention.

As provided above, another exemplary application for fiber optic security systems according to the present invention is the monitoring of cargo containers configured to hold and secure goods during transit or storage. FIG. 7A illustrates cargo train 702 including engine 704 and cargo car 706. Cargo car 706 holds a plurality of cargo containers 300b, where each cargo container 300b includes a local control node 150. Engine 704 includes remote control unit 160. FIG. 7B illustrates cargo ship 708 carrying a plurality of cargo containers 300b, where each cargo container 300b includes a local control node 150. Cargo ship 708 also carries remote control unit 160. FIG. 7C illustrates exemplary cargo container 300b such as those carried by train 702 (in FIG. 7A) and ship 708 (in FIG. 7B). Cargo container 300b includes access doors 300b1 and 300b2. Local control node 150 is secured to cargo container 300b. Fiber optic cable 100 is affixed to cargo container 300b (e.g., at doors 300b1, 300b2), and is connected to local control node 150.

Figure 8:
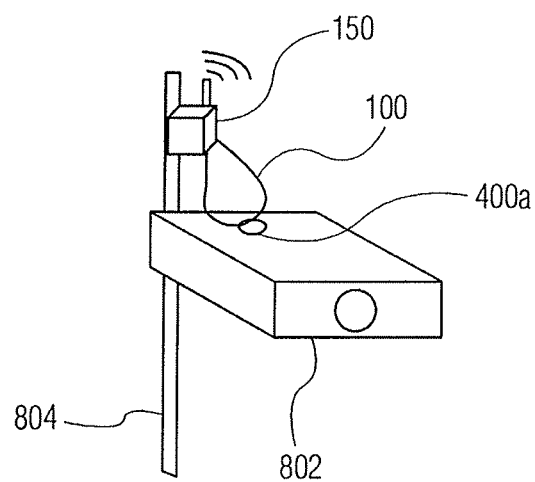
FIG. 8 is a block diagram perspective view of video camera and elements of a fiber optic security system in accordance with an exemplary embodiment of the present invention.

As provided above, another exemplary application for fiber optic security systems according to the present invention is the monitoring of cameras (e.g., video cameras). FIG. 8 illustrates security camera 802 supported by mounting pole 804. Local control node 150 is mounted to mounting pole 804. Fiber optic cable 100 is affixed to camera 802 (e.g., using a fastener such as fastener 400 illustrated in FIGS. 4A-4B). Cable 100 is connected to local control node 150. Local control node 150 communicates with remote control unit 160 (not shown in FIG. 8).

Figure 9:
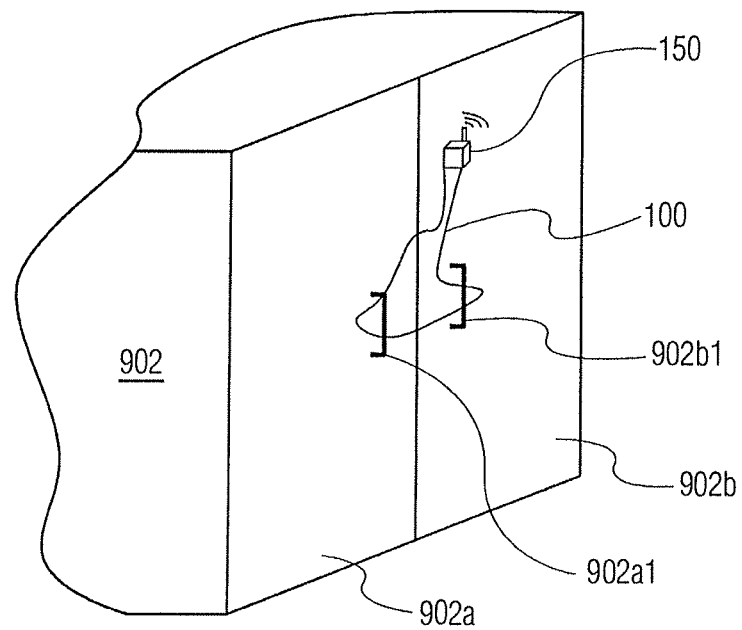
FIG. 9 is a block diagram perspective view of an entry door and elements of a fiber optic security system in accordance with an exemplary embodiment of the present invention.

As provided above, another exemplary application for fiber optic security systems according to the present invention is the monitoring of entry doors (e.g., entry doors into rooms). FIG. 9 illustrates room 902 including entry doors 902a, 902b. Local control node 150 is mounted to door 902b. Fiber optic cable 100 is affixed to doors 902a, 902b (e.g., through door handles 902a1, 902b1, and/or in addition to other areas of doors 902a, 902b). Cable 100 is connected to local control node 150. Local control node 150 communicates with remote control unit 160 (not shown in FIG. 9).

Figure 10:
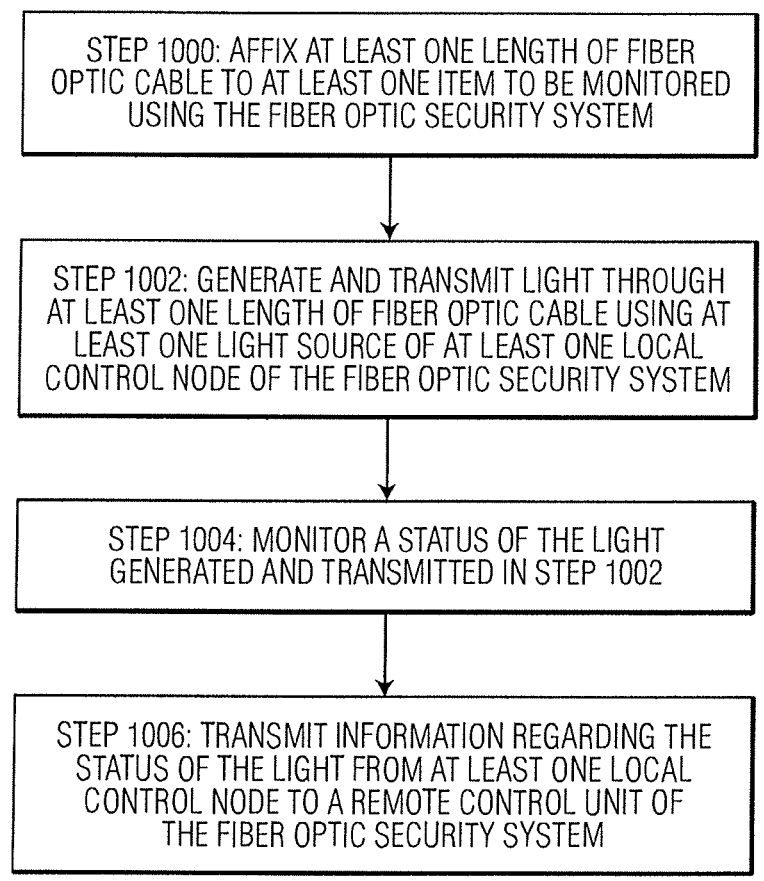
FIG. 10 is a flow diagram illustrating a method of operating a fiber optic security system in accordance with an exemplary embodiment of the present invention.

FIG. 10 is a flow diagram illustrating a method of operating a fiber optic security system in accordance with an exemplary embodiment of the present invention. As is understood by those skilled in the art, certain steps included in the flow diagram may be omitted; certain additional steps may be added; and the order of the steps may be altered from the order illustrated. At step 1000, at least one length of fiber optic cable is affixed to at least one item to be monitored using the fiber optic security system. Referring to the example illustrated in FIGS. 4A-4B, fiber optic cable 100 is affixed to item 300 using fastener 400. As will be appreciated by those skilled in the art, although only a single fiber optic cable 100 is illustrated in FIGS. 4A-4B, multiple lengths of fiber optic cable (e.g., parallel lengths of fiber optic cable) may be affixed to the item to be monitored.

At step 1002, light is generated and transmitted through the at least one length of fiber optic cable using at least one light source of at least one local control node of the fiber optic security system. For example, FIG. 1B illustrates light source 200 (e.g., an LED such as an SLED or ELED, a laser, etc.) that generates light and transmits the light along fiber optic cable 100 affixed to item 300. At step 1004, a status of the light generated and transmitted in Step 1002 is monitored. For example, the status of the light being monitored may refer to one or more characteristics of the light that are monitored such as, for example: (1) an intensity of the light; (2) a repetition rate of a pulsing of the light; and (3) a duration of pulses of the light. At step 1006, information regarding the status of the light is transmitted from the at least one local control node to a remote control unit of the fiber optic security system. For example, FIG. 1B illustrates the output of processor 600 connected to communications device 700. Communications device 700 communicates the information regarding the status of the light to remote control unit 160.

According to an exemplary embodiment of the present invention, each local control node periodically communicates its status to the remote control unit to provide information concerning a number of potential tamper conditions. Detected tamper conditions are transmitted as alarms by the local control node immediately to the remote control unit. One such potential tamper condition is a restart of the local control node (e.g., indicating interruption of power to the local control node). For example, if power is removed from the local control node, and then re-applied to the local control node, this may be communicated to the remote control unit as an unexpected restart (e.g., communicated as an alarm condition, communicated a status indication, etc.).

The present invention may utilize a "handshake" type methodology to automatically respond to interference by other systems operating at the same communication frequency (or by intentional attempts to jam the operating frequency). Upon startup (and/or at a predetermined time interval), the remote control unit may be configured to "search" for a desirable operational frequency. That is, the remote control unit "listens" for transmissions from the local control nodes (e.g., status transmissions from the local control nodes are considered "healthy" status transmissions). Upon detection of these transmissions, the remote control unit broadcasts "received" messages at a predetermined interval (e.g., 1 second intervals) until status transmissions sent from a predetermined percentage of the local control nodes are detected. Upon detection of status transmissions from fewer than the predetermined percentage of the local control nodes within a predetermined time interval, logic of the remote control unit determines that the system is operating at a sub-optimal frequency (e.g., one that has been jammed or one on which a nearby system is also operating). The remote control unit then listens at other available operating frequencies (e.g., selected from a group of predetermined frequencies) and selects another frequency based on certain predetermined criteria (e.g., criteria such as a frequency at which there is the lowest amount of total received energy, that is, the fewest current number of users on that frequency). After the remote control unit changes the frequency, if a broadcast from the remote control unit has not been received by a given local control node within a predetermined timeout period, logic of the local control node assumes that its operational communication frequency is different from that of the remote control unit (e.g., because it was changed by the remote control unit). In such a case, a status message is sent by the local control node at the next frequency in a predetermined series of potential operational frequencies. This continues until a "received" message has been received by the local control node. At that point in time, the local control node logic assumes it is operating at the correct frequency.

It will be appreciated that the fiber optic security system may be designed to accommodate many (e.g., hundreds) of local control nodes in communication with a single remote control unit. Such an arrangement creates the potential problem of conflicts during which multiple local control nodes are attempting to communicate with the remote control unit simultaneously. To mitigate this problem, it is desirable that status messages be sent at a reasonable rate. More specifically, in connection with certain exemplary embodiments of the present invention, the rate of transmission of a status message from the local control node may vary (e.g., the rate of transmission may change from a first rate before proper communication is established, and at a second less frequent rate after proper communication is established). In a specific example, the local control node transmits a message (e.g., at a predetermined frequency configured to be received by the remote control unit) at a first transmission rate, such as 1 transmission per second, in an attempt to establish (or continue) proper communication with the remote control unit. After receipt of the message from the local control node, the remote control unit broadcasts a "received" message to each of the plurality of local control nodes, where the remote control unit message includes the unique address of the local control node from which the transmission had been received. Receipt of this "received" message at the local control node whose address matches the broadcast "received" message causes this local control node to reset a timer/counter. That is, as opposed to transmitting the message at the first rate (e.g., one transmission per second), the local control node transmits the message at a second transmission rate, such as 1 transmission per 15 seconds. By reducing the transmission rate, this helps conserve energy within the batteries of the local control node, and also clears the communication frequency for an extended period of time enabling more unimpeded time for other local control nodes that may be having their transmissions in conflict with each other.

It will be appreciated that if a remote control unit has not received a status message from a local control node within a predetermined time (e.g., 60 seconds), the remote control unit logic assumes that the local control node has been damaged or destroyed, and the remote control unit may transmit an alarm condition (e.g., a "lost" alarm condition) to a user and/or monitoring station 170 illustrated in FIG. 1A.

Although illustrated and described above with reference to certain specific embodiments, the present invention is nevertheless not intended to be limited to the details shown. Rather, various modifications may be made in the details within the scope and range of equivalents of the claims and without departing from the spirit of the invention.

What is claimed:

1. A fiber optic security system comprising:
   at least one length of fiber optic cable affixed to at least one item to be monitored using the fiber optic security system;
   at least one local control node, the at least one local control node including at least one light source for generating and transmitting light through the at least one length of fiber optic cable, the at least one local control node monitoring a status of the light; and
   a remote control unit for receiving information regarding the status of the light from the at least one local control node.

2. The fiber optic security system of claim 1 wherein the at least one length of fiber optic cable is affixed to the at least one item to be monitored in a manner such that the at least one item to be monitored cannot be separated from the at least one length of fiber optic cable without at least one of: (1) damaging the at least one item to be monitored, (2) damaging the local control node, (3) cutting of the at least one length of fiber optic cable, and (4) separating the at least one length of fiber optic cable from the local control node.

3. The fiber optic security system of claim 1 wherein the at least one light source includes at least one of a light emitting diode and a laser.

4. The fiber optic security system of claim 1 wherein the at least one light source is configured to generate the light as a series of light pulses.

5. The fiber optic security system of claim 1 wherein the at least one light source is configured to generate the light as a series of light pulses having a repetition rate of between 0.001 seconds and 10 seconds.

6. The fiber optic security system of claim 1 wherein the at least one local control node includes at least one light receiving unit for receiving the light and for converting the received light to an electrical signal.

7. The fiber optic security system of claim 6 wherein the at least one light receiving unit amplifies and filters the electrical signal prior to analysis of the electrical signal by the detection unit.

8. The fiber optic security system of claim 1 wherein the at least one local control node includes an electrical power source for supplying electrical power to the at least one local control node.

9. The fiber optic security system of claim 1 further comprising a monitoring station for communicating with the remote control unit, the remote control unit communicating alarm conditions to the monitoring station.

10. The fiber optic security system of claim 9 wherein the monitoring station is a facility monitoring system.

11. The fiber optic security system of claim 9 wherein the alarm conditions communicating to the monitoring station include at least one of: (1) damage to the at least one length of fiber optic cable; (2) disconnection between the at least one length of fiber optic cable and the at least one local control node; (3) damage or tampering with the at least one local control node; (4) unintended restart of the at least one local control node; (5) a characteristic of the light generated and transmitted through the at least one length of fiber optic cable differing from a predetermined range of the characteristic; and (6) interruption or loss of electrical power supplied to the at least one local control node.

12. The fiber optic security system of claim 1 further comprising a fastener for affixing the length of fiber optic cable to the at least one item to be monitored.

13. The fiber optic security system of claim 12 wherein the fastener includes a clevis pin configured to be inserted into an aperture defined by the at least one item to be monitored, wherein the length of fiber optic cable is configured to pass through a hole in the clevis pin.

14. The fiber optic security system of claim 13 wherein the aperture defined by the item to be monitored is an aperture of a mounting structure of the device to be monitored, the clevis pin including a head extending to a shaft, the hole in the clevis pin being defined by the shaft of the clevis pin, the head being positioned at a first side of the mounting structure, and the fiber optic cable passing through the hole at a second side of the mounting structure opposite the first side of the mounting structure, wherein an exposed length of the shaft (1) between the head and the first side of the mounting structure, and (2) between the second side of the mounting structure and the hole, is less than 1 mm.

15. The fiber optic security system of claim 1 wherein the at least one item to be monitored includes a solar photovoltaic panel configured to convert light energy received by the solar photovoltaic panel into electrical energy.

16. The fiber optic security system of claim 1 wherein the at least one item to be monitored includes a cargo container configured to hold and secure goods during transit or storage.

17. The fiber optic security system of claim 1 wherein the at least one item to be monitored includes a camera.

18. The fiber optic security system of claim 1 wherein the at least one item to be monitored includes an access door to an enclosed area.

19. The fiber optic security system of claim 1 wherein the at least one local control node includes a local control node enclosure and an interlock configured to be activated upon unauthorized opening of the local control node enclosure.

20. The fiber optic security system of claim 19 wherein the at least one local control node determines an alarm condition upon activation of the interlock, the local control node configured to transmit the alarm condition to the remote control unit.

21. The fiber optic security system of claim 1 wherein the local control node determines at least one characteristic of the light generated and transmitted through the at least one length of fiber optic cable in order to determine if the at least one characteristic differs from a predetermined range of the at least one characteristic.

22. The fiber optic security system of claim 21 wherein the at least one characteristic of the light includes at least one of (a) an intensity of the light generated and transmitted through the at least one length of fiber optic cable, (b) a repetition rate of a pulsing of the light generated and transmitted through the at least one length of fiber optic cable, and (c) a duration of pulses of the light generated and transmitted through the at least one length of fiber optic cable.

23. The fiber optic security system of claim 1 wherein communication between the local control node and the remote control unit is provided by way of at least one of wireless communication and radio frequency communication.

24. A solar photovoltaic panel security system comprising:
at least one length of fiber optic cable affixed to a portion of a solar photovoltaic panel;
at least one local control node, the at least one local control node including at least one light source for generating and transmitting light through the at least one length of fiber optic cable, the at least one local control node monitoring a status of the light; and
a remote control unit for receiving information regarding the status of the light from the at least one local control node.

25. The solar photovoltaic panel security system of claim 24 wherein the at least one light source is configured to generate the light as a series of light pulses having a repetition rate of between 0.001 seconds and 10 seconds.

26. The solar photovoltaic panel security system of claim 24 further comprising a fastener for affixing the at least one length of fiber optic cable to the portion of a solar photovoltaic panel.

27. The solar photovoltaic panel security system of claim 26 wherein the portion of the solar photovoltaic panel includes a support frame for the solar photovoltaic panel, the fastener including a clevis pin configured to be inserted into an aperture defined by the support frame, wherein the at least one length of fiber optic cable is configured to pass through a hole in the clevis pin.

28. The solar photovoltaic panel security system of claim 24 wherein the local control node determines at least one characteristic of the light generated and transmitted through the at least one length of fiber optic cable in order to determine if the at least one characteristic differs from a predetermined range of the at least one characteristic.

29. The solar photovoltaic panel security system of claim 28 wherein the at least one characteristic of the light includes at least one of (a) an intensity of the light generated and transmitted through the at least one length of fiber optic cable, (b) a repetition rate of a pulsing of the light generated and transmitted through the at least one length of fiber optic cable, and (c) a duration of pulses of the light generated and transmitted through the at least one length of fiber optic cable.

30. A method of operating a fiber optic security system, the method comprising the steps of:
(a) affixing at least one length of fiber optic cable to at least one item to be monitored using the fiber optic security system;
(b) generating and transmitting light through the at least one length of fiber optic cable using at least one light source of at least one local control node of the fiber optic security system;
(c) monitoring a status of the light generated and transmitted in step (b); and
(d) transmitting information regarding the status of the light from the at least one local control node to a remote control unit of the fiber optic security system.

31. The method of claim 30 wherein step (b) includes generating and transmitting the light as a series of light pulses.

32. The method of claim 30 wherein step (b) includes generating and transmitting the light as a series of light pulses having a repetition rate of between 0.001 seconds and 10 seconds.

33. The method of claim 30 further comprising a step of (b1) receiving the light using a receiving unit of the at least one local control node, and converting the received light to an electrical signal.

34. The method of claim 30 wherein step (a) includes affixing the at least one length of fiber optic cable to the at least one item to be monitored using a fastener.

35. The method of claim 30 wherein step (a) includes affixing the at least one length of fiber optic cable to the at least one item to be monitored using a clevis pin configured to be inserted into an aperture defined by the at least one item to be monitored, wherein the length of fiber optic cable is configured to pass through a hole in the clevis pin.

36. The method of claim 30 wherein step (c) includes determining at least one characteristic of the light generated and transmitted through the at least one length of fiber optic cable in order to determine if the at least one characteristic differs from a predetermined range of the at least one characteristic.

37. The method of claim 36 wherein the at least one characteristic of the light determined in step (c) includes at least one of (a) an intensity of the light generated and transmitted through the at least one length of fiber optic cable, (b) a repetition rate of a pulsing of the light generated and transmitted through the at least one length of fiber optic cable, and (c) a duration of pulses of the light generated and transmitted through the at least one length of fiber optic cable.

38. The method of claim 30 further comprising the step of (a1) establishing radio frequency communication between the local control node and the remote control unit.

39. The method of claim 38 further comprising the step of (e) transmitting an alarm from the remote control node to at least one of (1) a user of the fiber optic security system, and (2) a remote monitoring station of the fiber optic security system, upon the radio frequency communication between the local control node and the remote control unit being absent for a length of time greater than a predetermined time interval.

40. The method of claim 38 wherein the local control node transmits status messages to be received by the remote control unit at a first transmission rate until radio frequency communication between the local control node and the remote control unit has been established, and at a second transmission rate after radio frequency communication between the local control node and the remote control unit has been established, the first transmission rate being greater than the second transmission rate.

* * * * *